(12) United States Patent
Blanchard St-Jacques

(10) Patent No.: US 12,176,755 B2
(45) Date of Patent: Dec. 24, 2024

(54) SYSTEMS FOR ELECTRIC MOTOR

(71) Applicant: DANA TM4 INC., Boucherville (CA)

(72) Inventor: Benoit Blanchard St-Jacques, Sainte-Julie (CA)

(73) Assignee: DANA TM4 INC., Boucherville (CA)

( * ) Notice: Subject to any disclaimer, the term of this patent is extended or adjusted under 35 U.S.C. 154(b) by 268 days.

(21) Appl. No.: 17/809,802

(22) Filed: Jun. 29, 2022

(65) Prior Publication Data

US 2024/0006935 A1    Jan. 4, 2024

(51) Int. Cl.
| | |
|---|---|
| *H02K 1/16* | (2006.01) |
| *H02K 3/14* | (2006.01) |
| *H02K 3/24* | (2006.01) |
| *B60K 1/02* | (2006.01) |

(52) U.S. Cl.
CPC ............ *H02K 1/165* (2013.01); *H02K 3/14* (2013.01); *H02K 3/24* (2013.01); *B60K 1/02* (2013.01)

(58) Field of Classification Search
CPC . H02K 1/165; H02K 3/14; H02K 3/24; B60K 1/02
USPC .......................................................... 310/216
See application file for complete search history.

(56) References Cited

U.S. PATENT DOCUMENTS

| | | |
|---|---|---|
| 7,550,892 B2 | 6/2009 | Hsu |
| 8,049,390 B2 | 11/2011 | Kamibayashi et al. |
| 8,319,390 B2 | 11/2012 | Snitchler et al. |
| 11,165,298 B2 | 11/2021 | Husain et al. |
| 2005/0206263 A1 | 9/2005 | Cai et al. |
| 2010/0026132 A1* | 2/2010 | Ooiwa ...................... H02K 3/12 310/201 |
| 2010/0090557 A1 | 4/2010 | El-Refaie et al. |
| 2010/0320864 A1* | 12/2010 | Rahman ................... H02K 3/12 310/201 |
| 2012/0326552 A1* | 12/2012 | Kinpara ................. H02K 1/165 310/216.069 |
| 2013/0192057 A1* | 8/2013 | Koga ..................... H02K 15/085 29/596 |
| 2013/0193798 A1* | 8/2013 | Koga ................. H02K 15/0031 310/208 |
| 2019/0149001 A1* | 5/2019 | Lee .......................... H02K 3/12 310/201 |
| 2020/0204022 A1 | 6/2020 | Karmaker et al. |
| 2020/0235621 A1 | 7/2020 | Husain |
| 2020/0295611 A1* | 9/2020 | Husain ..................... H02K 3/48 |
| 2020/0350804 A1* | 11/2020 | Ono ......................... H02K 3/28 |

(Continued)

FOREIGN PATENT DOCUMENTS

| | | |
|---|---|---|
| WO | 2020092570 A1 | 5/2020 |
| WO | 2021105593 A1 | 6/2021 |

OTHER PUBLICATIONS

Zhao, Y. et al., "Overview of the Rectangular Wire Windings AC Electrical Machine," CES Transactions on Electrical Machines and Systems, vol. 3. No. 2, Jun. 2019, 10 pages.

(Continued)

*Primary Examiner* — Rashad H Johnson
(74) *Attorney, Agent, or Firm* — McCoy Russell LLP

(57) ABSTRACT

Systems are provided for an electric motor. In one example, a system may include a plurality of segmented slots positioned around an inner surface of a stator, wherein each of the plurality of segmented slots comprises a first section comprising a first width and a second section comprising a second width, the second width different than the first.

18 Claims, 10 Drawing Sheets

(56) References Cited

U.S. PATENT DOCUMENTS

| | | | |
|---|---|---|---|
| 2021/0006115 A1* | 1/2021 | Nehl | H02K 1/276 |
| 2021/0408855 A1* | 12/2021 | Islam | H02K 1/2766 |
| 2023/0208216 A1* | 6/2023 | Momen | H02K 1/276 |
| | | | 310/156.56 |
| 2023/0268790 A1* | 8/2023 | Ito | H02K 3/12 |
| | | | 310/179 |

OTHER PUBLICATIONS

Simpson, N. et al., "Additive Manufacturing of a Conformal Hybrid-Strand Concentrated Winding Topology for Minimal AC Loss in Electrical Machines," Proceedings of the 2021 IEEE Energy Conversion Congress and Exposition (ECCE), Oct. 10, 2021, Vancouver, BC, Canada, 8 pages.

* cited by examiner

SYSTEMS FOR ELECTRIC MOTOR

TECHNICAL FIELD

The present description relates generally to stator slot configurations to enhance an electric motor power density.

BACKGROUND AND SUMMARY

Electric proliferation of vehicles includes various levels of electrification in the form of different degrees of hybrid abilities and all-electric abilities. An electric motor may be configured to drive one or more axles of a vehicle via electric energy from an energy storage device. The space available for the electric motor may be limited due to a desire to reduce packaging size of vehicle components to increase efficiencies.

One example for reducing a size of the electric motor and increasing efficiency is to increase a slot-fill ratio of the electric motor. Some applications may use rectangular wires in the electric motor to enhance a filling factor. Slots shaped for accommodating the rectangular wires may include only a single wire size, which may limit performance of the electric motor due to thermal limits and efficiency of the windings. As speeds increased, skin effect may cause the current density to increase a surface of the conductors and proximity effect generates more loss for the conductors closer to a slot opening. The magnetic field from the rotor may also cause high frequency losses on the conductors closer to the slot opening.

In one example, the issues described above may be addressed by a system for a stator assembly of an electric motor, comprising a plurality of segmented slots positioned around an inner surface of a stator. Each of the plurality of segmented slots comprises a first section comprising a first width and a second section comprising a second width. The second width is different than the first width. In this way, the stator configuration may provide more power density and reduced electrical losses.

As an example, the sections and the wires positioned therein may match in width. In one example, there are no gaps between the wires and surfaces of the sections of the segmented slots. By doing this, heat extraction of the windings may be enhanced, which may improve an electrical performance of the electric motor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The advantages described herein will be more fully understood by reading an example of an embodiment, referred to herein as the Detailed Description, when taken alone or with reference to the drawings, where.

DETAILED DESCRIPTION

Figure 1:
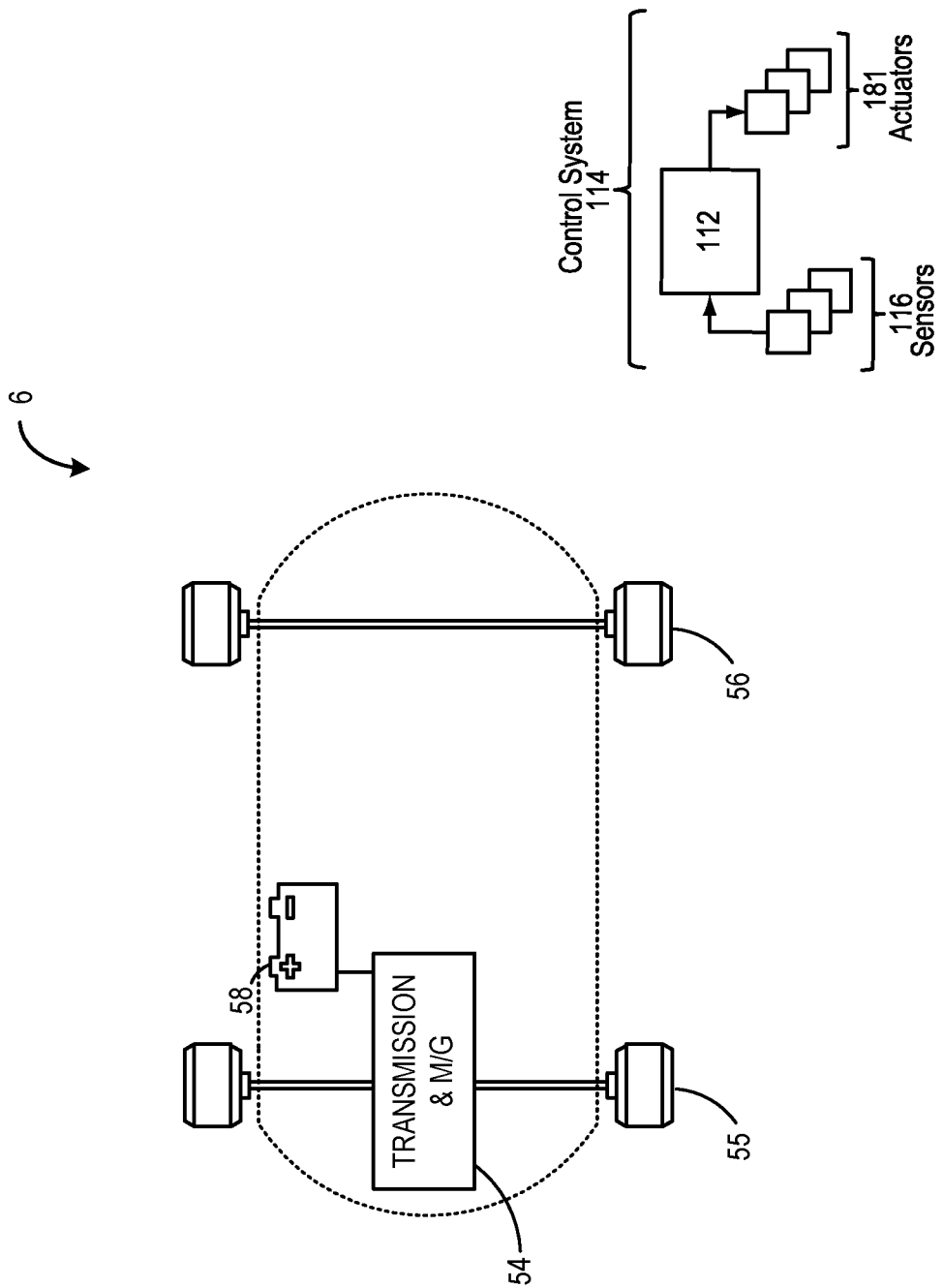
FIG. 1 illustrates a schematic of a vehicle including an electric motor.
Figure 2:
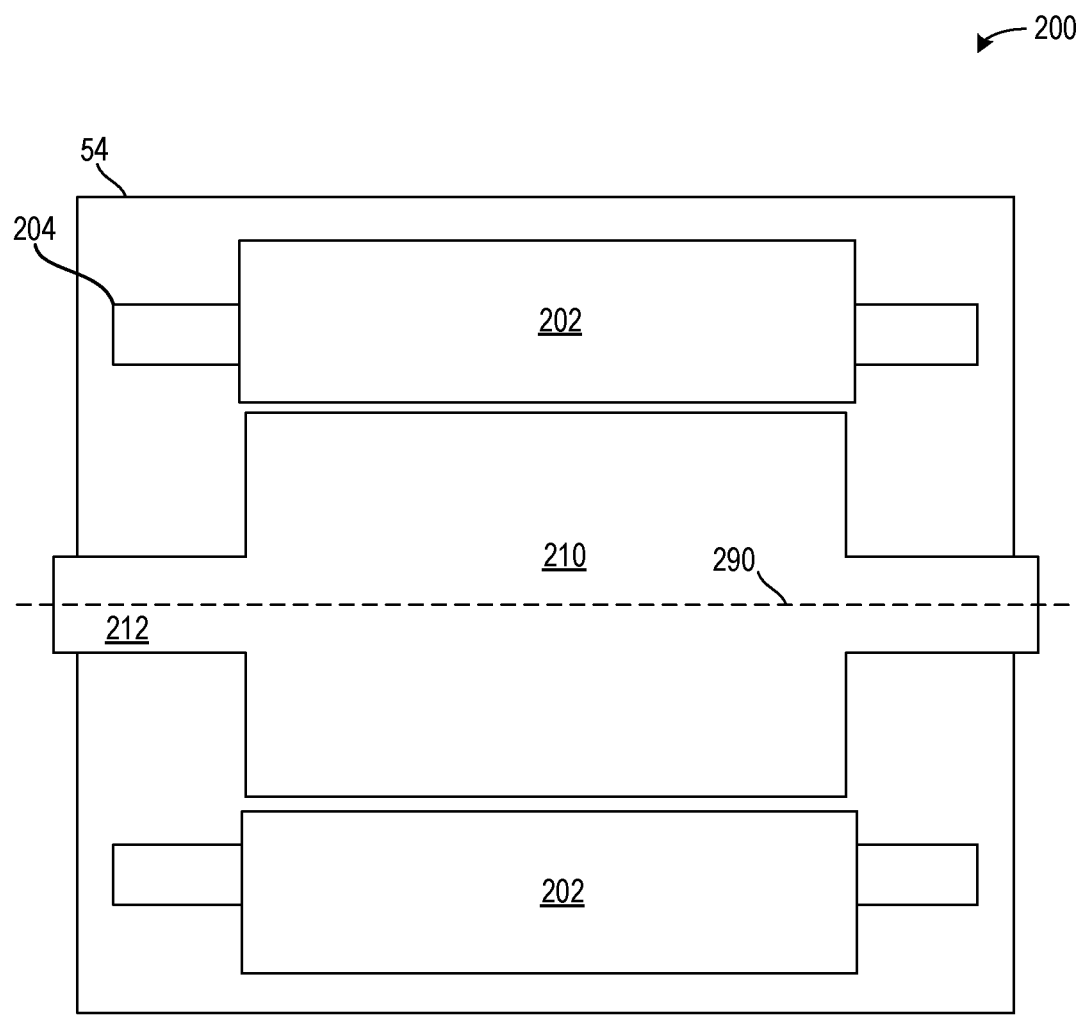
FIG. 2 illustrates a cross-section of the electric motor.
Figure 2:
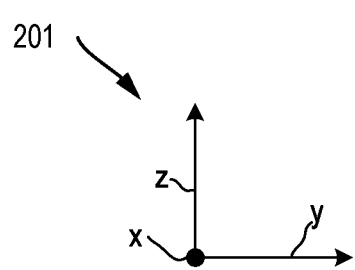
Figure 5:
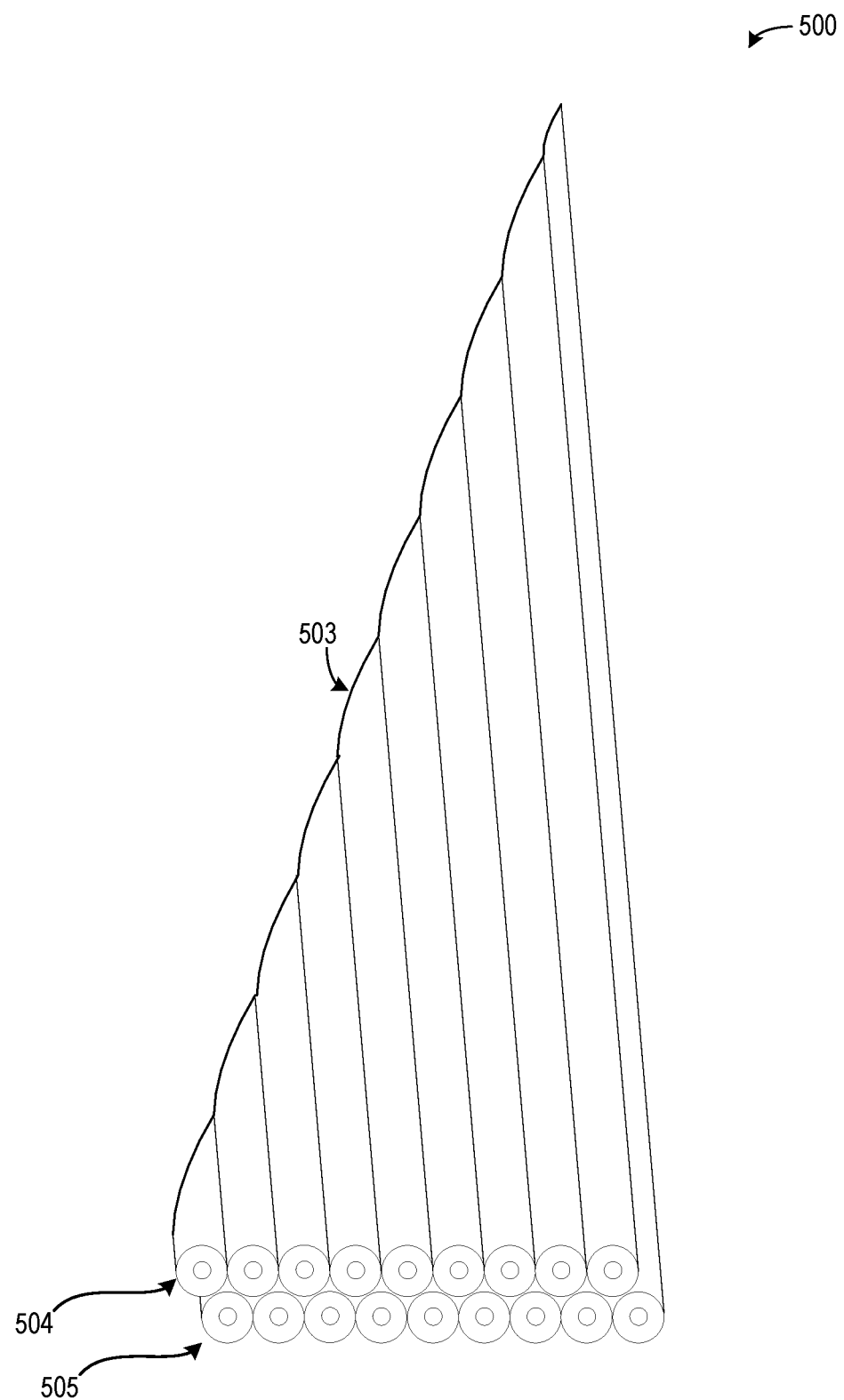
FIG. 5 illustrates a first embodiment of a Rutherford cable.
Figure 6:
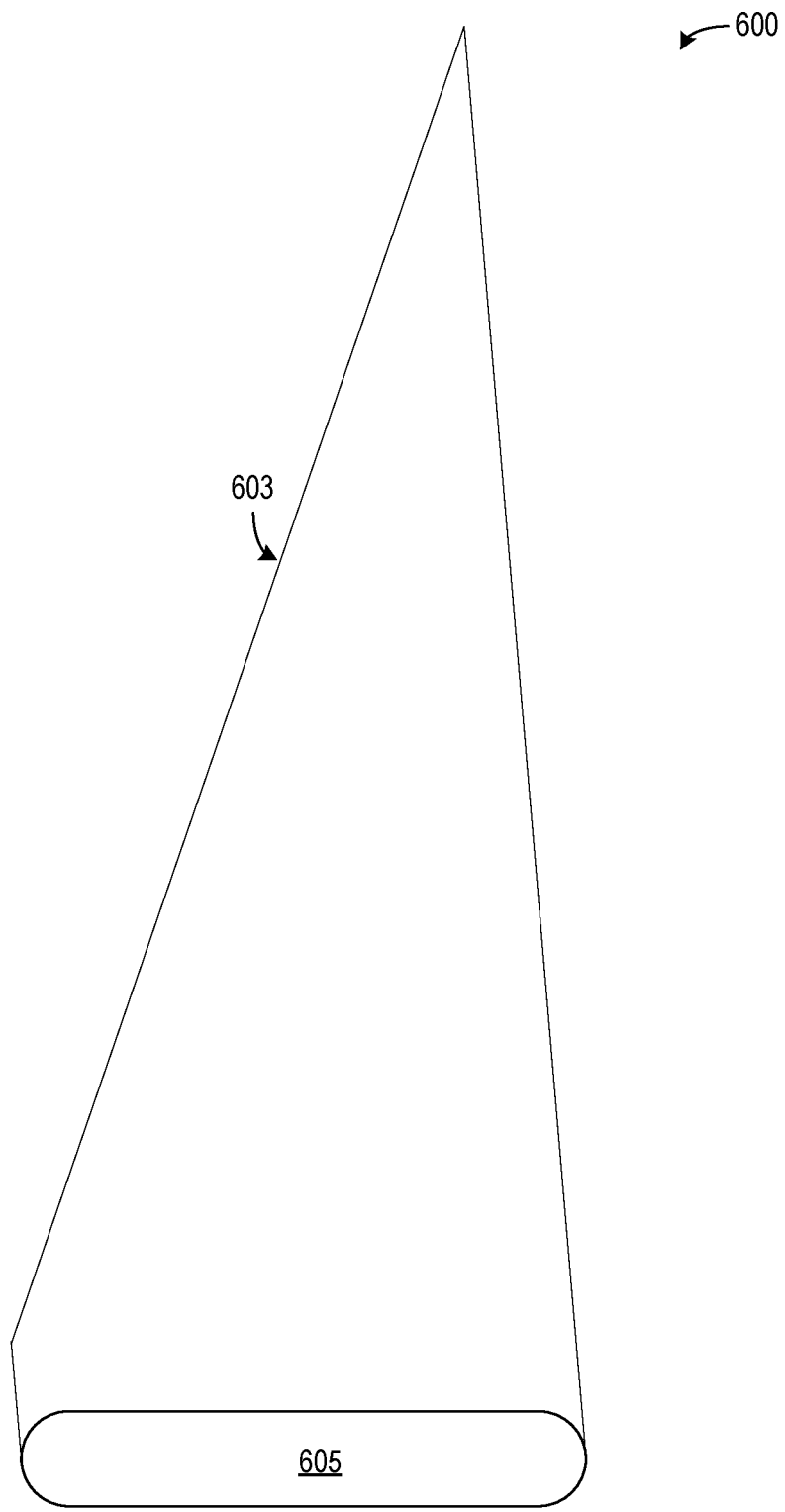
FIG. 6 illustrates a first embodiment of a Robel bar.
Figure 7:
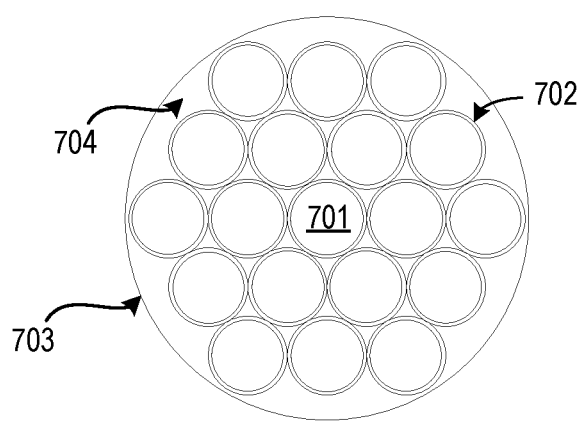
FIG. 7 illustrates a first embodiment of a Litz wire.
Figure 8:
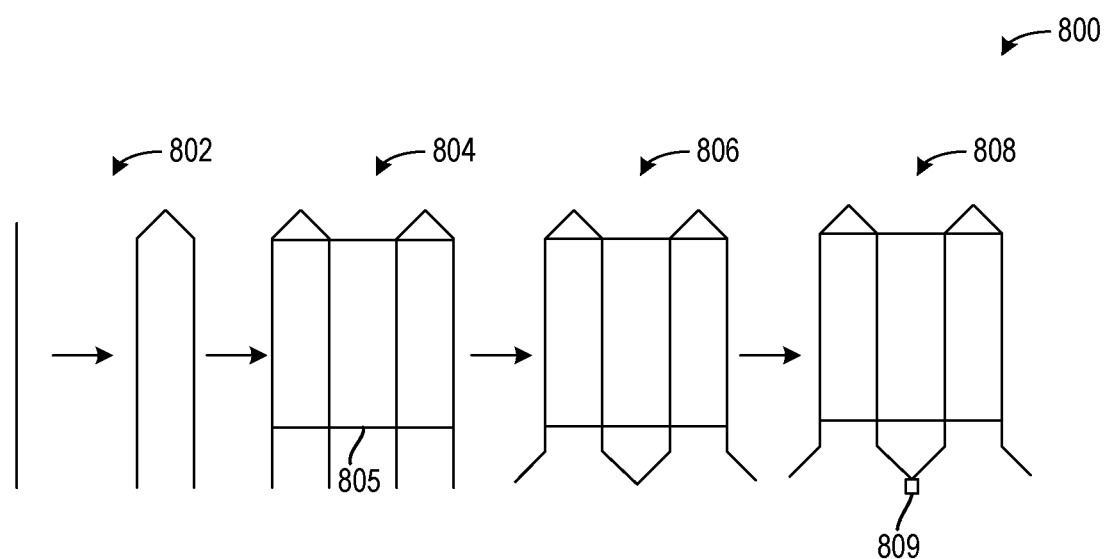
FIG. 8 illustrates a production process of winding axially inserted wires through a stator core.
Figure 9:
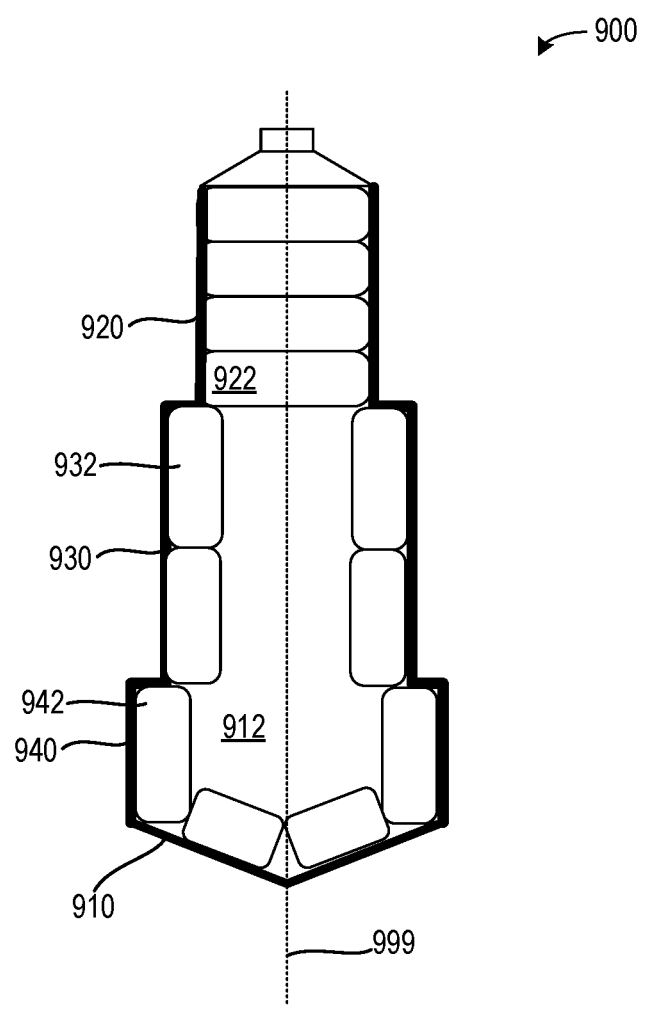
FIG. 9 illustrates an alternate embodiment of a stator slot with windings extending therethrough.
Figure 10:
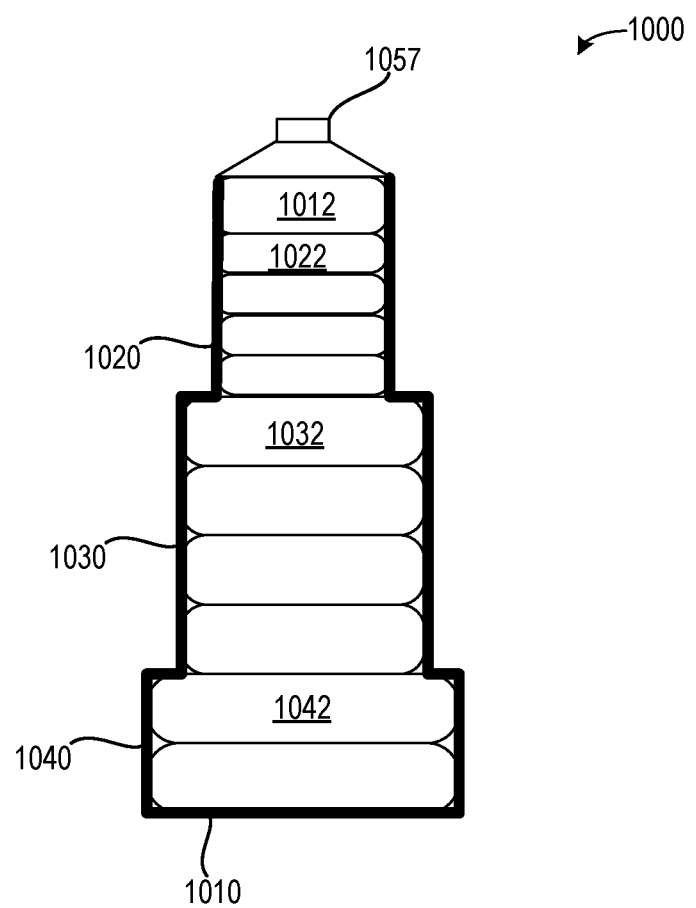
FIG. 10 illustrates a further embodiment of a stator slot with windings extending therethrough.

The following description relates to systems for stator slots of an electric motor. The electric motor may be arranged in a vehicle as illustrated in FIG. 1. A cross-section of the electric motor is illustrated in FIG. 2. The stator slots may include a variety of shapes and wires arranged therein, as detailed in FIGS. 3-4. FIG. 5 illustrates a first embodiment of a Rutherford cable. FIG. 6 illustrates a first embodiment of a Robel bar. FIG. 7 illustrates a first embodiment of a Litz wire. FIG. 8 illustrates a production process of winding axially inserted wires through a stator core. FIGS. 9 and 10 illustrate alternate embodiments of a stator slot.

In one example, the electric motor includes a rotor and a stator concentrically arranged around an axis. The stator may include a plurality of slots in which windings with different wire types are arranged. Wire types may include different gauges and wire configurations. Wire configurations may include solid wire, stranded wire, and hybrid wire. For a given gauge, solid wire may include a single wire with a gauge equal to the given gauge. Stranded wire may include a plurality of wires that when pressed together include a gauge equal to the given gauge. Hybrid wire may include a single wire surrounded by a plurality of wires extending in a direction parallel to the single wire. The combination of the single wire and the plurality of wires may comprise a gauge equal to the given gauge.

In one example, a number of a single wire types within a single slot may be even (e.g., 2, 4, 6, etc.), such that a single wire type is arranged in pairs when using U-shaped wires axially inserted into the slot (e.g., normal to a radially direction) and welded on only one side. If the wire types are arranged with welds at both ends (e.g., I-shaped wires), then the wires may be arranged individually or as pairs. An axial view of U-shaped windings coupled to one another and inserted axially through a stator core is shown in embodiment 800 of FIG. 8. Step 802 illustrates a shaping, step 804 illustrates an insertion of wires into a stator core 805, step 806 illustrates a twisting of neighboring wires, and step 808 illustrates a welding 809 of the neighboring wires at an end winding location.

In one example, the plurality of connections for wires extending through stator slots may be wider at a section furthest from a slot opening relative to other stator configurations. The slots, and therefore the connections, are configured to support different wire types, thereby allowing higher gauge wires (e.g., smaller diameter wires) to be arranged closer to the slot opening, and lower gauge wires (e.g., higher diameter wires) to be arranged in the section furthest from the slot opening. The location of the lower gauge wires may reduce direct current (DC) resistance relative to other stator configurations. Furthermore, the cross-sectional area of the slot may be increased at the section, resulting in an increased interface between the windings and a stator core, which may decrease thermal resistance between the windings and the core, resulting in improved electric motor efficiency. High frequency losses, which may be associated with copper windings, may be reduced at high frequencies via the larger cross-sectional area decreasing a leak in magnetic flux. Furthermore, thinner conductors, relative to previous examples, may be arranged between the slot opening and the sections of the stator slot. The thinner conductors may increase DC resistance and low frequency losses, while decreasing high frequency losses. Thus, the conductor may be sized according to a desired application (e.g., DC or AC).

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a vehicle system 6 that can derive propulsion power from an electric motor/transmission 54. Electric motor 54 receives electrical power from a traction battery 58 to provide torque to rear vehicle wheels 55. In one example, an inverter may be arranged between the traction battery 58 and the electric motor/transmission 54. Electric motor 54 may also be operated as a generator to provide electrical power to charge traction battery 58, for example, during a braking operation. It should be appreciated that while FIG. 1 depicts an electric motor 54 mounted in a rear wheel drive configuration, other configurations are possible, such as employing electric motor 54 in a front wheel configuration, or in a configuration in which there is an electric motor mounted to both the rear vehicle wheels 55 and front vehicle wheels 56.

Electric motor 54 may include a gearbox integrated therein (to be described further therein). Additionally or alternatively, the electric motor 54 may be coupled to an outside of a transmission/gearbox housing. The integrated gearbox may include a differential and a planetary gear set for transmitting power from the electric motor 54 to the rear vehicle wheels 55. Electric motor 54 may also include at least one clutch. Controller 112 may send a signal to an actuator of the clutch to engage or disengage the clutch, so as to couple or decouple power transmission from the electric motor 54 to the rear vehicle wheels 55 or the front vehicle wheels 56. Additionally or alternatively, there may be multiple traction batteries configured to provide power to different driven wheels, wherein power to the wheels may be predicated based on traction at the wheels, driver demand, and other conditions. In one example, the vehicle system 6 includes an all-wheel drive vehicle system.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, etc. The controller 112 may receive input data from the various sensors, process the input data, and trigger the actuators in response to the processed input data based on instruction or code programmed therein corresponding to one or more routines.

Turning now to FIG. 2, it shows an embodiment 200 of a side-sectional view of an electric motor 54. As such, components previously introduced may be similarly numbered in this and subsequent figures. The motor 54 may include a stator 202. The stator 202 may comprise a hollow, cylindrical shape that surrounds an outer surface of a rotor 210 coupled to a rotor shaft 212. As illustrated, a gap may be arranged between the stator 202 and the rotor 210.

Figure 3:
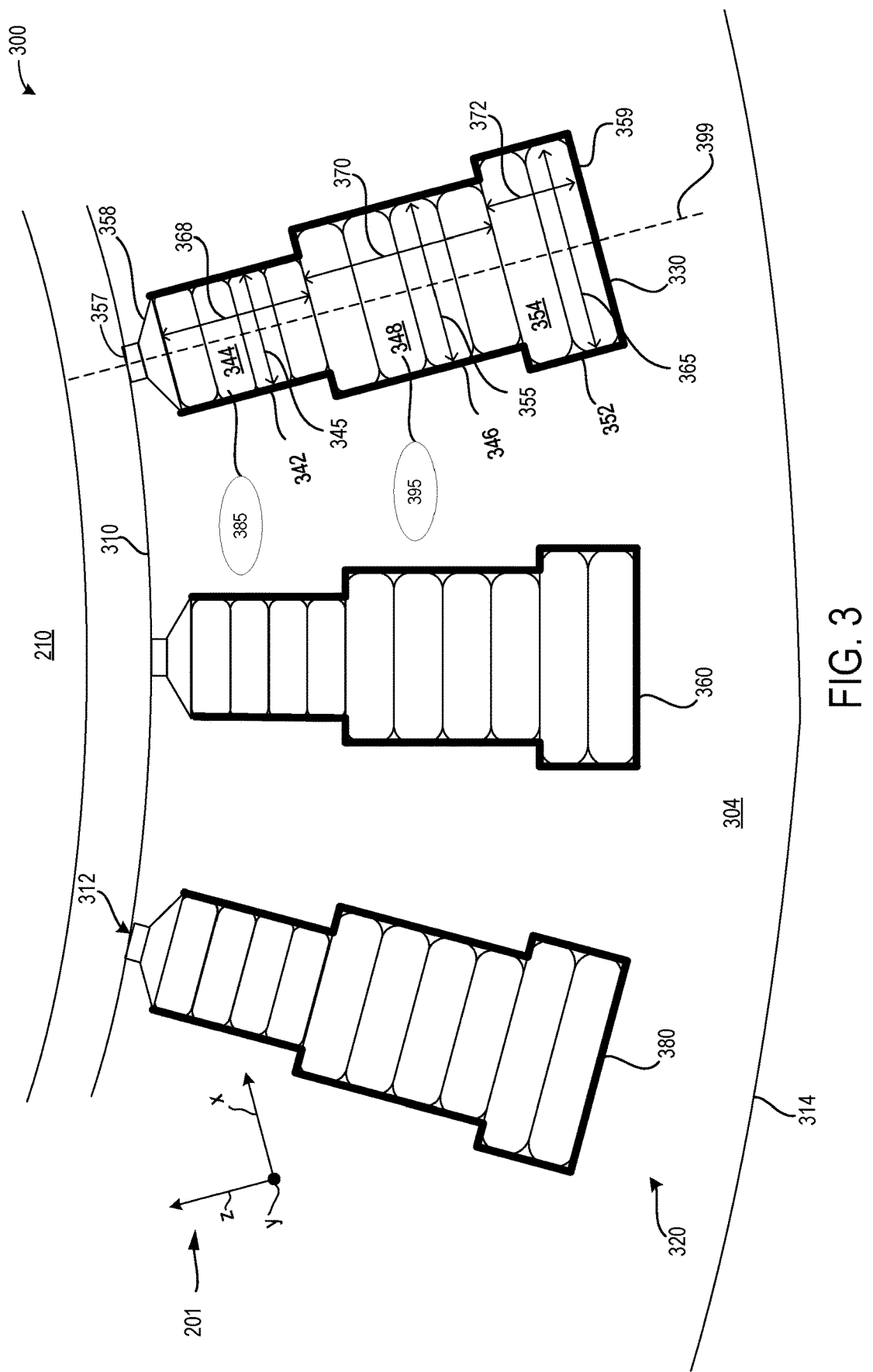
FIG. 3 illustrates a first embodiment of windings of stator slots of an electric motor.
Figure 4:
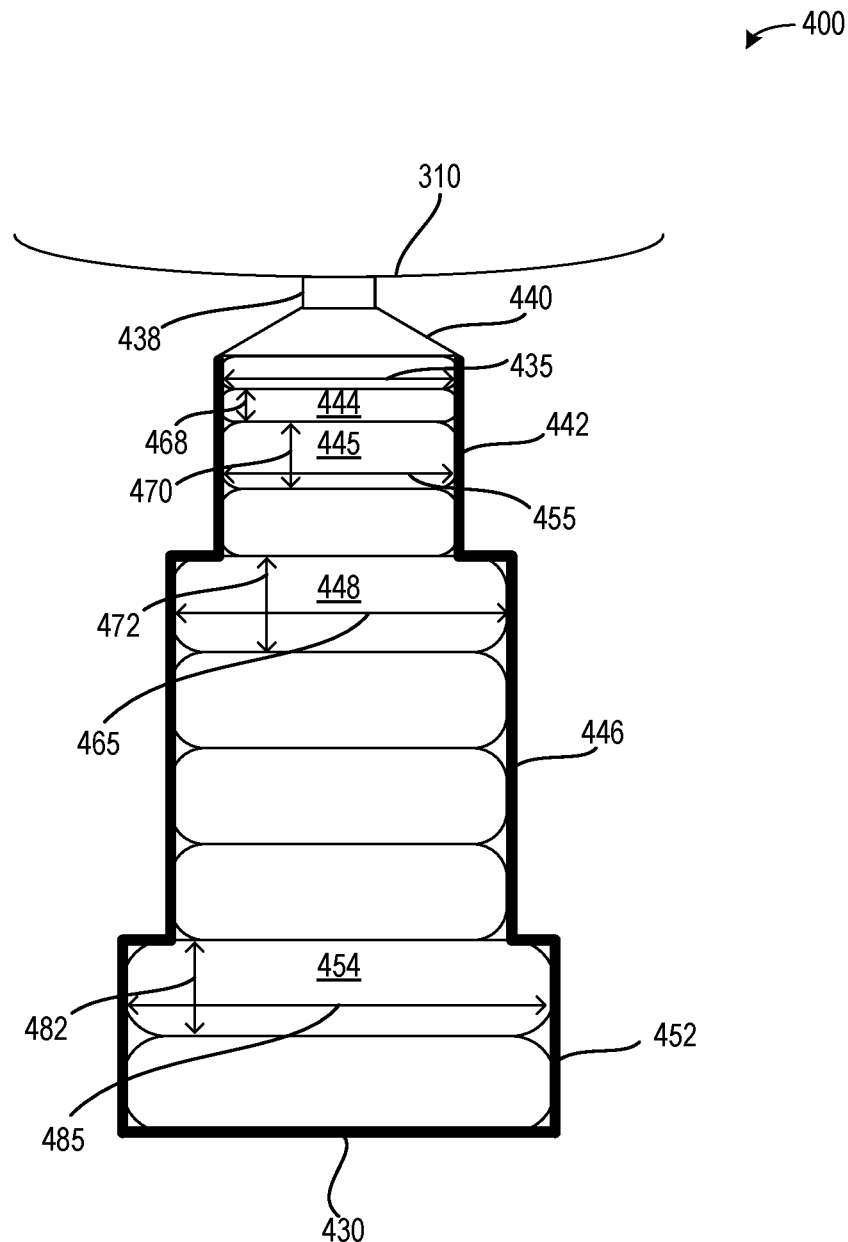
FIG. 4 illustrates a first embodiment of a winding of different wire types in a single slot.

A set of reference axes 201 are provided for comparison between views shown in FIG. 2-4. The reference axes 201 indicate a y-axis, an x-axis, and a z-axis. In one example, the y-axis may be parallel a central axis 290 of the electric motor 54. When referencing direction, positive may refer to in the direction of the arrow of the y-axis, x-axis, and z-axis and negative may refer to in the opposite direction of the arrow of the y-axis, x-axis, and z-axis. The x-axis may be normal to the y-axis and the central axis 290. The z-axis may be normal to each of the y and x axes.

The rotor 210 and the stator 202 may be concentric about a central axis 290. The rotor shaft 212 may extend in a direction parallel to the central axis 290. The rotor 210 may rotate about the central axis 290 as the stator 202 remains stationary. The stator 202 may include end windings 204 extending from a body therefrom.

The stator 202 may include a plurality of slots 320 extending through a stator core 304 of the stator 202, as shown in axial view 300 of FIG. 3. FIGS. 2 and 3 may be described in tandem herein The plurality of slots 320 may receive one or more wires of an I shaped winding or a U-shaped winding. The plurality of windings may extend through the plurality of slots 320 In one example, the axial direction is parallel to the central axis 290.

In one example, the stator 202 includes an inner surface 310 nearest to the rotor 210 and an outer surface 314 distal to the rotor 210. The plurality of slots 320 may traverse between the inner surface 310 and outer surface 314 toward the end surfaces of the stator 202. The plurality of slots 320 may be arranged in the stator core 904 via additive manufacturing, injection molding, or other manufacturing technique such as stack of stamp or cut electrical steel sheets. The plurality of windings extend in a direction parallel to the slots, wherein ends of the windings may be connected to one another via welds or other connections. The plurality of slots may include electric wires (e.g., windings) arranged therein.

Each of the plurality of stator slots 320 may include two or more unique sections, characterized by their different widths. The width may be measured in a direction normal to each of the axial and radial directions. In one example, each of the plurality of stator slots 320 may include three sections, wherein each of the sections may include a single width. A transition between each of the sections may be configured such that there are no intervening widths or other widths other than the three unique widths of the three sections, as will be described herein.

The plurality of stator slots 320 may be arranged adjacent to the inner stator surface 310. The inner stator surface 310 may include a circular cross-section and concentric with the rotor 210 about axis 290 of shaft 212. The inner stator surface 310 may be sealed except for a plurality of openings 312 arranged therein corresponding to slot openings of the plurality of stator slots 320.

As illustrated in FIG. 3, each of the plurality of stator slots 320 may include three sections. A first stator slot 330, of the plurality of stator slots 320, may include a first section, a second section, and a third section 342, 346, and 352, respectively. The first section 342 may include a first width 345. The second section 346 may include a second width 355. The third section 352 may include a third width 365. In one example, the first section 342 includes only the first width 345, the second section 346 includes only the second width 355, and the third section 352 includes only the third width 365. Each of the first width 345, the second width 355, and the third width 365 is measured in a direction normal to a central axis 399 of the first slot 330. The central axis 399 extends parallel to the radial direction and normal to the central axis 290.

The second section 346 may be arranged between the first and third sections 342, 352. The first section 342 may be nearest to a slot opening 357, of the plurality of slot openings 312, and the third section 352 may be furthest from the slot opening 357. In one example, the width of the first stator slot 330 increases stepwise in a direction away from the slot opening 357 and parallel to a central axis 399 of the stator slot. For example, the third width 365 is greater than the second width 355, and the second width 355 is greater than the first width 345. An interface between the sections may extend in a direction normal to the central axis 399. In this way, the first stator slot 330 only includes the three widths of the three sections, with no intervening or gradually changing widths arranged therebetween. In an alternative embodiment, the first stator slot 330 may comprise more than three sections, each increasing stepwise in the direction away from the slot opening 357. The width of each section may be a uniform, single width. In one example, the width of each section does not change in the direction away from the inner stator surface 310.

Each section may include a rectangular cross-sectional shape, the cross-section taken along a plane parallel to the direction away from the inner stator surface 310 (e.g., a radial direction). The width of each section may be measured in a direction normal to the central axis 399 of the first stator slot 330. The first width 345 may be less than the second width 355, the second width less than the third width 365. In one example, a difference between each width may be based on a fixed amount. For example, the second width may be greater than the first width by and the third width may be greater than the second width by 5-50%.

The widths of each section may be uniform in a direction parallel to the central axis 399. In one example, the separate widths of the first stator slot 330 increase stepwise from a first terminal end 358 to a second terminal end 359. For example, between the first width 345 of the first section 342 to the second width 355 of the second section 346, there may be no intervening widths or other widths with a value between the first width 345 and the second width 355. Similarly, there may be no intervening widths between the second width 355 and the third width 365.

Thus, in one example, the first stator slot 330 includes at least three distinct sections, namely the first section 342 including the first width 345, the second section 346 including the second width 355, and the third section 352 including the third width 365. The width of each of the sections may be uniform such that each section includes only a single width. The widths may be sized to reduce spacing between a liner or inner surface of the first stator slot 330 and windings arranged therein. In one example, a plurality of hairpin wingings are arranged through the plurality of slots 320. By doing this, the stator operation may be enhanced with reduced electrical losses.

Additionally or alternatively, a height of each section may be different. The height may be measured in a radial direction normal to the width and parallel to the central axis 399. For example, the first section 342 may include a first height 368. The second section 346 may include a second height 370. The third section 352 may include a third height 372. The first height 368 may be identical or less than the second height 370. The second height 370 may be greater than the third height 372.

The plurality of stator slots 320 may extend around the entire circumference of the inner stator surface 310. The plurality of stator slots 320 may be equally spaced from one another about the inner stator surface 310. A position of the plurality of stator slots 320 may not change during operation of the electric motor. The plurality of stator slots 320 may be identical along the entire circumference of the inner stator surface 310. In some examples, one or more of the plurality of stator slots 320 may be different relative to others of the plurality of stator slots 320 with regard to a packaging of wires therein, as will be described in greater detail below.

The first stator slot 330 may further include a first terminal end 358 and a second terminal end 359. The first terminal end 358 may be arranged at an end of the first stator slot 330 opposite the second terminal end 359, the ends opposite one another along the central axis 399. The terminal end 358 may be between the slot opening 357 and the first section 342. In one example, each of the first and second terminal ends 358, 359 may seal the first stator slot 330 such that lubricant or other fluids may not enter therein.

A width of the second terminal end 359 may be greater than a width of the first terminal end 358. In one example, the width of the second terminal end 359 may be equal to the third width 365. A largest width of the first terminal end 358 may be equal to the first width 345. In some examples, additionally or alternatively, the width of the first terminal end 358 may narrow in a direction away from the first section and toward the inner stator surface 310. In one example, the first terminal end 358 is a material different than a material lining and/or shaping the first stator slot 330. For example, the first terminal end 358 may be a conductor comprising a trapezoidal shape, wherein the width of the first terminal end 358 changes gradually. In one example, the first terminal end 358 corresponds to ends of the electric wire (e.g., windings) narrowing toward one another. The second terminal end 359 may be an extreme end of the third section 352 extending in a direction normal to the central axis 399.

The sections may include one or more types of wires. In one example, the first section 342 may include a first wire 344. The second section 346 may include a second wire 348. The third section 352 may include a third wire 354. In one example, the first wire 344 may include a plurality of wires. Additionally or alternatively, the second wire 348 and/or the third wire 354 may include a plurality of wires. In the example of FIG. 3, each of the first wire 344, the second wire 348, and the third wire 354 may be identical. In one example, the embodiment of FIG. 3 includes U-shaped hairpin windings extending through the plurality of slots 320. An example of I-shaped hairpin windings extending through a plurality of slots with different wires arranged in each slot is shown in FIG. 4.

The first wire 344, the second wire 348, and the third wire 354 may be arranged in each corresponding section of the first stator slot 330 to match a width thereof. In one example, the first wire 344 within section 342 may be shaped as a rectangle comprising a longitudinal width equal to the first width 345. Each of the first section 342, the second section 346, and the third section 352 may include one or more of the first wire 344, the second wire 348, and the third wire 354. In one embodiment, the first section 342 may include exactly four sets (e.g., two pairs) of the first wire 344, wherein each set includes the first wire 344 wrapped into a rectangular shape with a longitudinal width equal to the first width 345. In some examples, additionally or alternatively, the first wire 344 may be a single, solid wire with an insulation layer extruded around a rectangular solid. Additionally or alternatively, the first wire may be type 8 litz wire (e.g., formed litz wire) may include multiple strands that may be wrapped, twisted, or shaped into a rectangular shape. In some examples, the first section 342 may include less than or greater than four sets of the first wire 344. In another embodiment, the second section 346 may include exactly four sets of the second wire 348. Each set of the second wire 348 may include the second wire 348 wrapped in a rectangular shape with a longitudinal width equal to the second width 355. In some examples, the second section 346 may include less than or greater than four sets of the second wire 348. In another embodiment, the third section 352 may include exactly two sets of the third wire 354. In some examples, the third section 352 may include less than or greater than two sets of the third wire 354. Each set of the third wire 354 may include the third wire 354 arranged in a rectangular shape with a longitudinal width equal to the third width 365. By shaping the wires to match a width of a corresponding section, gaps between the wires and an interior surface (e.g., a liner) of the first stator slot 330 may be reduced, improving the thermal transfer of the copper losses, which may enhance performance of the electric motor.

Each set of the first wire 344 may have the same or similar wrapped height (e.g., thickness). Each set of the second wire 348 may have the same wrapped height. Each set of the third wire 354 may have the same wrapped height. In one example, the wrapped heights of the first wire 344, the second wire 348, and the third wire 354 may be the same or different. Heights of the wrapped wires may be adjusted based on a gauge of the wire.

In one example, a set of a wire refers to a wire included in a single winding. For example, the first slot 330 may include 10 wires extending therethrough, four wires being the first wire 344, four wires being the second wire 348, and two wires being the third wire 354. The four sets of the first wire 344 are included in four separate windings. The four sets of the second wire 348 are included in four separate windings. The two sets of the third wire 354 are included in two separate windings. As such, the first slot 330 and an adjacent slot, such as the second slot 360 may be packed via 10 U-shaped hairpin windings.

One or more of the first wire, the second wire, and the third wire 344, 348, and 354, respectively, may include a plurality of stranded wires. In one example, the plurality of stranded wires may be copper, aluminum, a combination thereof, or other conductive material. In one example, the wires may be twisted into the shape of a rectangle. In one embodiment, the wire 344 may be a type eight Litz wire or, alternatively, a set of high-gauge wire. In one embodiment, the wire 354 may be twisted strands formed into the shape of a rectangle. In one example, the plurality of stranded wires may include a bundle of higher gauge wires that when wound mimic a single wire with a lower gauge. The plurality of stranded wires may be more flexible than a single, solid wire with a lower gauge.

Additionally or alternatively, one or more of the first wire, the second wire, and the third wire 344, 348, and 354, respectively may include solid wire. In one example, solid wire may include a single wire comprising a single gauge. The solid wire may be less flexible than a plurality of stranded wires, while providing enhanced performance.

In yet another example, one of the first wire, the second wire, and the third wire 344, 348, and 354, respectively, may include a solid wire wrapped with stranded wire around its exterior, herein referred to as a hybrid wire. In one example, the first wire 344 includes a plurality of stranded wires and the second wire 348 and the third wire 354 include solid wire. In one example, the plurality of wire 344 in the first section 368 is a type eight Litz wire 385. In one example, the plurality of wire 348 in the second section 346 is a Robel bar 395, or alternatively, a Rutherford cable. In one example, the plurality of wire 354 in the third section 352 is a Robel bar, or alternatively, a Rutherford cable.

The plurality of stator slots 320 may further include the second stator slot and a third stator slot 360, 380, respectively. The second stator slot 360 and the third stator slot 380 may be substantially identical to the first stator slot 330. As such, the second stator slot and the third stator slot 360, 380, respectively, may include a plurality of separate sections including widths identical to widths of the sections of the first stator slot 330. Each section of each slot includes one uniform width along its height measured along its central axis 399. The wires included in the second stator slot 360 and the third stator slot 380 may be identical to the wires included in the first stator slot 330 when using U-shaped windings. In some examples, the wires included in the second stator slot 360 and the third stator slot 380 may be different than the wires included in the first stator slot 330 when using I-shaped windings.

Turning now to FIG. 4, it shows an embodiment 400 illustrating a stator slot 430 including three sections, including a first section 442, a second section 446, and a third section 452. In one example, the stator slot 430 may be included in the example of FIG. 3 and part of the plurality of stator slots 320. In one example, the stator slot 430 included a plurality of I-shaped windings and the stator slots illustrated in FIG. 3 includes a plurality of U-shaped windings. As such, a stator may include a plurality of slots including the U-shaped windings and/or the I-shaped windings.

The stator slot 430 may include a first terminal end 440 positioned between a slot opening 438 and the first section 442. In one example, the first section 442 may include a first width 455 with two types of wire 444, 445. In one example, the first wire 444 or the second wire 445, within the first section 442, is a plurality of type eight Litz wire. Alternatively, the first wire 444 or second wire 445 may be a plurality of high-gauge wire twisted into the shape of a rectangle, while the wire 448, 454 may be a low gauge wire. A first wire 444 may be shaped into a rectangle with a height 468 and width equal to the first width 455. A second wire 455 may be may be shaped into a rectangle with a height 470 and width equal to the first width 455. In one example, the height 470 may be greater than the height 468, wherein a sum of the height 468 and the height 470 of each set of the first wire 444 and the second wire 445 may be equal to a total height of the first section 442. In this way, a cross-sectional area of the first wire 444 may be less than a cross-sectional of the second wire 445. In some examples, additionally or alternatively, one or more of the first wire 444 and the second wire 445 may be stranded wire. In another embodiment, one or more of the first wire 444 and the second wire 445 may be solid wire. In an alternative embodiment, one or more of the first wire 444 and the second wire 445 may be a hybrid wire.

In the example of FIG. 4, a second section 446 may include the third wire 448 and a third section 452 may include the fourth wire 454. As such, each wound grouping of the third wire 448 in the second section 446 may comprise a rectangular cross-sectional shape with a height 472 and a width equal to the second width 465 of the second section 446. In one embodiment, a third wire 448 may be a type eight Litz wire Rutherford cable, Robel wire, or any other suitable transposed wire. A transposed wire is comprised of individual copper conductors twisted and/or woven to form a pattern which reduces electrical losses due to eddy currents. Alternatively, a third wire 448 may be a plurality of high-gauge wire pressed into the shape of a rectangle, and extended to fill the width of the second section 446. Similarly, each wound grouping of the fourth wire 454 in the third section 452 may comprise a rectangular cross-sectional shape with a height 482 and a width equal to a third width 485 of the third section 452. In one example, the heights 472 and 482 may be identical. In one example, the width 465 may be less than the width 485. In one example, the wire 454 may be a plurality of low-gauge wire. Additionally or alternatively, heights of the packaged wires may increase in a direction away from the slot opening 438, such that the height 468 is less than the height 470, the height 470 is less than the height 472, and the height 472 is less than the height 482. In one embodiment, the gauges of the wires may decrease in the direction away from the slot opening 438, such that the first wire 444 is the highest gauge and the fourth wire 454 is the lowest gauge. By arranging the wires in the first section 442 to include a smaller height wire, such as a type eight Litz wire, Rutherford cable, Robel bars, or any other suitable transposed wire, adjacent to the terminal end 440, the cross-sectional area in the third section 452 is greater than that of the cross-sectional area found within the first section 442. Rutherford cable is one that has a plurality of high-gauge wire woven into a helical shape, and flattened into the shape of a rectangle. This may reduce AC electrical losses closer to the slot opening 438. In one example, the third width 485 may be larger than other slot widths used in previous stator examples. By increasing the cross-sectional area of the stator slot 430, an area of an interface between the wires in the slot 430 and a stator core is also increased, which may result in increased thermal resistance and enhanced motor efficiency. In one example, the interface area is an area where the slot and/or the wires are in contact with the stator core. By more densely packing the higher-gauge stranded wire near the slot opening 438, the motor is capable of producing more power output per unit volume.

In one example, the first wire 444 and the second wire 445 are arranged in pairs. The first wire 444 and the second wire 445 are hairpin windings using U-shaped wires axially inserted (e.g., normal to a central axis) into the slot 430 and welded at a single side. Additionally or alternatively, the first section 442 may include four different types of wire arranged in an I-shape and welded at both ends. In one example, a section may include a wire arranged in pairs and another wire arranged without a pair (e.g., individually). As another example, the third section 452 may include two different types of wires. A wire type may herein include a specific gauge and/or structure (e.g., solid, stranded, a combination thereof (hybrid), or hollow core). Thus, the first wire 444 may be differentiated from the second wire 445 or the other wires by gauge and/or structure.

In some examples, additionally or alternatively, the second section 446 and/or the third section 452 may include multiple types of wires similar to the first section 442, packaged (e.g., wound) into different rectangular cross-sectional areas.

Turning now to FIG. 5, which details an embodiment 500 of a Rutherford cable 503, or alternatively, a plurality of high-gauge wire twisted into the shape of a rectangle, and extended to fill the width of the entire first section 342. In one example, a high-gauge wire 344 may be a plurality of type eight Litz wire 385, transposed over one another such that they occupy the height 368 of the first section 342. In another example, a high-gauge wire 344 may be a Rutherford wire 503. A Rutherford wire 503 is one that comprises a plurality of high-gauge wire formed into the shape of a rectangle, with individual wires arranged in such a manner whereby the void of a first row of wires 504 is occupied by a second row of wires 505.

Turning now to FIG. 6, which details an embodiment 600 of a Robel bar 603, or alternatively, a low-gauge wire that has a rectangular cross-section 605. In one example, the wire 348 occupying the second section 346, and the wire 354 occupying the third section 352 may be a plurality of Robel bars 603, or alternatively, a plurality of low-gauge wire twisted into the shape of a rectangle, and transposed over one another in such a manner that they occupy the height 370 of the second section 346 and the height 372 of the third section 352.

Turning now to FIG. 7, which details a cross-sectional view 700 of a first embodiment of a Litz wire 703, comprising a plurality of high-gauge wire braided together. Each of the plurality of wire strands 701 is wrapped with individual insulators, and the Litz wire 703 is again wrapped in a common insulator 702. In one example, the plurality of wire strands 701 is arranged such that each set of strands occupies the void created by an adjacent set of strands. In some examples, additionally or alternatively, a wire may include a cooling channel in its center, as shown in FIG. 9. Non-electrically conductive liquid may flow through the center. In this way, the conductors of the present application may be hollow and comprise non-conductive coolants flowing therethrough.

Turning now to FIG. 9, it shows an embodiment 900 of a stator slot 910 including a cooling channel 912 arranged in its center. The cooling channel 912 may be arranged in a center of a second section 930 and a third section 940 of the stator slot 910. A first section 920 of the stator slot 910 may be packed with first wire 922. The second wire 932 of the second section 930 and the third wire 942 of the third section 940 may be oriented differently than than the first wire 922 in the first section 920. In one example, the first wire 922 may be oriented normal to a central axis 999. The second wire 932 may be oriented parallel to the central axis 999. The third wire 942 may be oriented parallel and angled to the central axis 999.

In the example of FIG. 9, the third section 940 includes a pentagonal shape. An extreme end of the third section 940 distal to the slot opening and the second section 930 may include be pointed and include a tip or other feature deviating from linear. The stator slot 910, along with the stator slot 430 of FIG. 4, and the stator slots 320 of FIG. 3 may be included in a single stator core, in one example.

Turning now to FIG. 10, it shows an embodiment 1000 of a stator slot 1010 including a cooling channel 1012 arranged at a radially inward location between a first wire 1022 and a slot opening 1057. The cooling channel 1012 may be parallel to the first wire 1022 in a first section 1020, a second wire 1032 in a second section 1030, and a third wire 1042 in a third section 1040. The cooling channel 1012 may include coolant and/or air, which may improve thermal control of the wires.

The embodiment 1000 may be used with U-shaped or I-shaped pin windings. A copper or other conductive material cross-section may be maintained in the slot 1010, relative to the embodiment 900 of FIG. 9, while still providing space for the cooling channel 1012.

In one example, the stator of the present disclosure increases the packing density of the stator slot via tailoring wire widths to match internal width of segmented sections of the stator slot. The technical effect of segmenting the sections of the stator slot is to increase the packaging density, which results in reduced electrical losses as well as increased heat removal from the electric motor system compared to slots with only one width or a gradually changing width. Furthermore, manufacture of the stator slots and associated windings may be simplified by including a finite number of widths.

The disclosure provides support a system for a stator assembly of an electric motor including a plurality of segmented slots positioned around an inner surface of a stator, wherein each of the plurality of segmented slots comprises a first section comprising a first width and a second section comprising a second width, the second width different than the first. A first example of the system further includes where the first section is arranged between the second section and a slot opening of a slot of the plurality of segmented slots. A second example of the system, optionally including the first example, further includes where the first section comprises stranded wires and wherein the second section comprises solid wires. A third example of the system, optionally including one or more of the previous examples, further includes where the stranded wires are twisted into a rectangular shape and extend to fill an entire width of the first section. A fourth example of the system, optionally including one or more of the previous examples, further includes a third section comprising a third width, wherein the third width is different than each of the first width and the second width. A fifth example of the system, optionally including one or more of the previous examples, further includes where the third width is greater than the second width, and wherein the second width is greater than the first width. A sixth example of the system, optionally including one or more of the previous examples, further includes where the second section is arranged between the first section and the third section, and wherein the first section, the second section, and the third section are tiered. A seventh example of the system, optionally including one or more of the previous examples, further includes where each of the first section, the second section, and the third section is uniform in width.

The disclosure provides support for an electric motor including a stator, and a plurality of stator slots arranged proximally to an inner surface of the stator, wherein each slot of the plurality of stator slots is tiered and comprises a plurality of sections including a first section and a second section, wherein the first section comprises a first width and the second section comprises a second width greater than the first width. A first example of the electric motor the first section and the second section are uniform in width. A second example of the electric motor, optionally including the first example, further includes where the first section comprises a plurality of wires, the plurality of wires identical in gauge. A third example of the electric motor, optionally including one or more of the previous examples, further includes where the first section comprises a plurality of wires, the plurality of wires different in gauge. A fourth example of the electric motor, optionally including one or more of the previous examples, further includes where a wire gauge of wires in the first section is different than a wire gauge of wires in the second section. A fifth example of the electric motor, optionally including one or more of the previous examples, further includes a third section comprising a third width greater than the second width. A sixth example of the electric motor, optionally including one or more of the previous examples, further includes where widths the first section, the second section, and the third section are stepped.

The disclosure further provides support for a vehicle comprising an electric motor including a stator and a rotor concentrically arranged about an axis, a plurality of stator slots arranged proximally to an inner surface of the stator, each of the plurality of stator slots comprising a first section, a second section, and a third section, wherein the first section comprises only a first width, the second section comprises only a second width, and the third section comprises only a third width. A first example of the vehicle further includes where there are no other widths other than the first width, the second width, and the third width. A second example of the vehicle, optionally including the first example, further includes where windings arranged in each of the plurality of stator slots are shaped into a rectangular cross-section, and wherein a width of the rectangular cross-section is equal to a width of a corresponding section. A third example of the vehicle, optionally including one or more of the previous examples, further includes where the first section comprises first wires shaped into a rectangular cross-section having a first height and the first width, the first section further comprising second wires shaped into a rectangular cross-section having a second height and the first width, the second height greater than the first height. A fourth example of the vehicle, optionally including one or more of the previous examples, further includes where the first width is less than the second width, and the second width is less than the third width, and wherein a height of wires arranged in the first section is less than a height of wires arranged in the second section and the third section, the height measured along a central axis of a stator slot.

Note that the example control and estimation routines included herein can be used with various electric machine and/or vehicle system configurations. The control methods and routines disclosed herein may be stored as executable instructions in non-transitory memory and may be carried out by the control system including the controller in combination with the various sensors, actuators, and other electric machine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the electric machine control system, where the described actions are carried out by executing the instructions in a system including the various electric machine hardware components in combination with the electronic controller.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a stator assembly of an electric motor, comprising:
a plurality of segmented slots positioned around an inner surface of a stator, wherein each of the plurality of segmented slots comprises a first section comprising a first width and a second section comprising a second width, the second width different than the first, and wherein a height of wires arranged in the first section is less than a height of wires arranged in the second section, the height measured along a central axis of a stator slot.

2. The system of claim 1, wherein the first section is arranged between the second section and a slot opening of a slot of the plurality of segmented slots.

3. The system of claim 1, wherein the first section comprises stranded wires and wherein the second section comprises solid wires.

4. The system of claim 3, wherein the stranded wires are twisted into a rectangular shape and extend to fill an entire width of the first section.

5. The system of claim 1, further comprising a third section comprising a third width, wherein the third width is different than each of the first width and the second width.

6. The system of claim 5, wherein the third width is greater than the second width, and wherein the second width is greater than the first width.

7. The system of claim 5, wherein the second section is arranged between the first section and the third section, and wherein the first section, the second section, and the third section are tiered.

8. The system of claim 5, wherein the first section has only the first width, the second section has only the second width, and the third section has only the third width.

9. An electric motor, comprising:
a stator; and
a plurality of stator slots arranged proximally to an inner surface of the stator; wherein
each slot of the plurality of stator slots is tiered and comprises a plurality of sections including a first section and a second section, wherein the first section comprises a first width and the second section comprises a second width greater than the first width, and wherein the first section comprises a plurality of wires, the plurality of wires different in gauge.

10. The electric motor of claim 9, wherein the first section is uniform in width such that the first section comprises only the first width and the second section is uniform in width such that the second section comprises only the second width.

11. The electric motor of claim 9, wherein the first section comprises a plurality of wires, the plurality of wires identical in gauge.

12. The electric motor of claim 9, wherein a wire gauge of wires in the first section is different than a wire gauge of wires in the second section.

13. The electric motor of claim 9, further comprising a third section comprising a third width greater than the second width.

14. The electric motor of claim 13, wherein widths of the first section, the second section, and the third section are stepped, and wherein a cooling channel is arranged in one or more of the first section, the second section, and the third section.

15. A vehicle comprising an electric motor, comprising:
a stator and a rotor concentrically arranged about an axis; and
a plurality of stator slots arranged proximally to an inner surface of the stator, each of the plurality of stator slots comprising a first section, a second section, and a third section, wherein the first section comprises only a first width, the second section comprises only a second width, and the third section comprises only a third width, and wherein there are no other widths other than the first width, the second width, and the third width in each stator slot.

16. The vehicle of claim 15, wherein windings arranged in each of the plurality of stator slots are shaped into a rectangular cross-section, and wherein a width of the rectangular cross-section is equal to a width of a corresponding section.

17. The vehicle of claim 15, wherein the first section comprises first wires shaped into a rectangular cross-section having a first height and the first width, the first section further comprising second wires shaped into a rectangular cross-section having a second height and the first width, the second height greater than the first height.

18. The vehicle of claim 15, wherein the first width is less than the second width, and the second width is less than the third width, and wherein a height of wires arranged in the first section is less than a height of wires arranged in the second section and the third section, the height measured along a central axis of a stator slot.

\* \* \* \* \*